United States Patent
Bugenhagen

(10) Patent No.: US 9,686,033 B2
(45) Date of Patent: *Jun. 20, 2017

(54) SYSTEM AND METHOD FOR ADVANCED ADAPTIVE PSEUDOWIRE

(71) Applicant: CenturyLink Intellectual Property LLC, Denver, CO (US)

(72) Inventor: Michael K. Bugenhagen, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/798,113

(22) Filed: Jul. 13, 2015

(65) Prior Publication Data

US 2015/0318940 A1    Nov. 5, 2015

Related U.S. Application Data

(63) Continuation of application No. 14/271,135, filed on May 6, 2014, now Pat. No. 9,112,627, which is a continuation of application No. 12/433,546, filed on Apr. 30, 2009, now Pat. No. 8,761,207.

(51) Int. Cl.
  *H04J 3/06* (2006.01)
  *H04L 12/721* (2013.01)
  *H04W 88/02* (2009.01)

(52) U.S. Cl.
  CPC .......... *H04J 3/065* (2013.01); *H04J 3/0632* (2013.01); *H04J 3/0685* (2013.01); *H04L 45/68* (2013.01); *H04W 88/02* (2013.01)

(58) Field of Classification Search
  None
  See application file for complete search history.

(56) References Cited

U.S. PATENT DOCUMENTS

| | | | |
|---|---|---|---|
| 6,178,213 B1 | 1/2001 | McCormack et al. |
| 6,895,023 B2 | 5/2005 | Fice et al. |
| 7,116,686 B2 | 10/2006 | Van Der Putten et al. |
| 7,130,368 B1 | 10/2006 | Aweya et al. |
| 7,315,546 B2 | 1/2008 | Repko et al. |
| 7,533,285 B2 | 5/2009 | Naffziger et al. |
| 7,558,275 B2 | 7/2009 | Champion |
| 7,613,212 B1 | 11/2009 | Raz et al. |
| 7,633,870 B2 | 12/2009 | Elliot |

(Continued)

OTHER PUBLICATIONS

U.S. Appl. No. 12/433,546; Final Rejection dated Jun. 21, 2011; 20 pages.

(Continued)

*Primary Examiner* — Michael J Moore, Jr.
(74) *Attorney, Agent, or Firm* — Swanson & Bratschun, L.L.C.

(57) ABSTRACT

A system and method for separating clock recovery for a pseudowire communication. An incoming signal is received for a pseudowire communication. The incoming signal is separated into a first signal and a second signal. Packets within the first signal are ordered in a first register. A clock signal is extracted from the second signal in a second register to generate a modified clock signal. A delay is incurred during generating of the modified clock signal. The first signal is communicated utilizing the modified clock signal.

14 Claims, 3 Drawing Sheets

(56) References Cited

U.S. PATENT DOCUMENTS

| | | | |
|---|---|---|---|
| 7,660,330 | B1 | 2/2010 | Shmilovici |
| 7,702,946 | B2 | 4/2010 | Wolf et al. |
| 7,821,958 | B2 | 10/2010 | Smith et al. |
| 8,761,207 | B2 | 6/2014 | Bugenhagen |
| 9,112,627 | B2 | 8/2015 | Bugenhagen |
| 2005/0110544 | A1 | 5/2005 | Suda et al. |
| 2005/0238127 | A1 | 10/2005 | Naffziger et al. |
| 2006/0187715 | A1* | 8/2006 | Narvaez ............ H04J 3/062 365/185.24 |
| 2006/0187822 | A1 | 8/2006 | Peleg |
| 2007/0206562 | A1* | 9/2007 | Libby ............... H04L 45/245 370/351 |
| 2009/0262759 | A1 | 10/2009 | Healey et al. |
| 2009/0274463 | A1 | 11/2009 | Bernard et al. |
| 2010/0111114 | A1 | 5/2010 | Geva et al. |
| 2010/0208582 | A1* | 8/2010 | Poulin ............... H04L 45/00 370/221 |
| 2010/0278291 | A1 | 11/2010 | Bugenhagen |
| 2011/0261842 | A1 | 10/2011 | Beili et al. |
| 2014/0241382 | A1 | 8/2014 | Bugenhagen |

OTHER PUBLICATIONS

U.S. Appl. No. 12/433,546; Final Rejection dated Jul. 15, 2010; 18 pages.
U.S. Appl. No. 12/433,546; Final Rejection dated Sep. 10, 2013; 20 pages.
U.S. Appl. No. 12/433,546; Issue Notification dated Jun. 14, 2014; 1 page.
U.S. Appl. No. 12/433,546; Non-Final Rejection dated Jan. 27, 2011; 20 pages.
U.S. Appl. No. 12/433,546; Non-Final Rejection dated Mar. 25, 2010: 35 pages.
U.S. Appl. No. 12/433,546; Notice of Allowance dated Feb. 6, 2014; 16 pages.
U.S. Appl. No. 12/433,546; Pre-Appeal Decision dated Nov. 10, 2010; 2 pages.
U.S. Appl. No. 14/271,135; Issue Notification dated Jul. 29, 2015; 1 page.
U.S. Appl. No. 14/271,135; Non-Final Rejection dated Dec. 24, 2014; 20 pages.
U.S. Appl. No. 14/271,135; Notice of Allowance dated Apr. 15, 2015; 11 pages.

\* cited by examiner

US 9,686,033 B2

SYSTEM AND METHOD FOR ADVANCED ADAPTIVE PSEUDOWIRE

This application is a continuation of U.S. patent application Ser. No. 14/271,135, filed May 6, 2014 by Bugenhagen and entitled, "System and Method for Advanced Adaptive Pseudowire" (now U.S. Pat. No. 9,112,627), which is a continuation of U.S. patent application Ser. No. 12/433,546 (now U.S. Pat. No. 8,761,207), filed Apr. 30, 2009 by Bugenhagen and entitled, "System and Method for Advanced Adaptive Pseudowire" both of which is hereby incorporated by reference in their entirety.

BACKGROUND

The use of and development of communications has grown nearly exponentially in recent years. The growth is fueled by larger networks with more reliable protocols and better communications hardware available to service providers and consumers. One embodiment of an important service is pseudowire. A pseudowire is an emulation of a native service over a packet switched network (PSN). The native service may be low-rate or high-rate time domain multiplexing (TDM), synchronous optical network (SONET)/SDH, asynchronous transfer mode (ATM), frame relay, or other similar service while the PSN may be Ethernet, multi-protocol label switching (MPLS), or other Internet protocol (IP).

One critical issue in implementing TDM pseudowire is clock recovery. In native TDM networks, the physical layer carries highly accurate timing information along with the TDM data. However, when emulating TDM over PSNs, this physical layer clock may be absent. TDM timing standards may be exacting and conformance with such standards may require innovative mechanisms to adaptively reproduce the TDM timing or original clock signal.

SUMMARY

One embodiment includes a system and method for for separating clock recovery for a pseudowire communication. An incoming signal may be received for a pseudowire communication. The incoming signal may be separated into a first signal and a second signal. Packets within the first signal are ordered in a first register. A clock signal may be extracted from the second signal in a second register to generate a modified clock signal. A delay may be incurred during generating of the modified clock signal. The first signal may be communicated utilizing the modified clock signal.

Another embodiment includes a system for clock recovery. The system may include a separator operable to separate an incoming signal into a first signal and a second signal. The system may also include a first register in communication with the separator. The first register may be operable to manage jitter and reorder packets for the first signal. The system may also include a second register in communication with the separator. The second register may be operable to recover a modified clock signal. The second register may introduce a second delay to recover the modified clock signal. The system may also include a transmitter in communication with the first register and the second register. The transmitter may be operable to play out the first signal synchronously utilizing the modified clock signal.

Yet another embodiment includes a clock recovery unit. The clock recover unit may include a processor for executing a set of instructions and a memory for storing the set of instructions. The set of instructions may be operable to receive an incoming signal, separate the incoming signal into a first signal and a second signal, ordering packets for the first signal in a first register, recover a modified clock signal from the second signal in a second register, ticks of the modified clock signal corresponding to ticks of an original clock signal with a delay for recovering the modified clock signal, and play out the first signal in response to the modified clock signal.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

An illustrative embodiment provides a system and method for adaptive clock recovery for pseudowire applications. In one embodiment, the data stream processing which may include ordering bits and/or packets and compensating for jitter may be implemented in a first small register or buffer with minimal delay. Recovery of a clock signal may be performed in parallel by a second larger register or buffer with a greater delay. The first signal may be played out for synchronous communications utilizing the recovered clock signal. The ticks of the original clock signal correspond to the ticks of the recovered clock signal even though there is a delay to generate the recovered clock signal. The ticks of the clock are time shifted, but identical for purposes of further communicating synchronous communications. The original clock signal may be a recovered signal or received directly from a reference clock. The illustrative embodiments may be utilized for any connections, systems, equipment, devices, or parties performing adaptive clock recovery.

Figure 1:
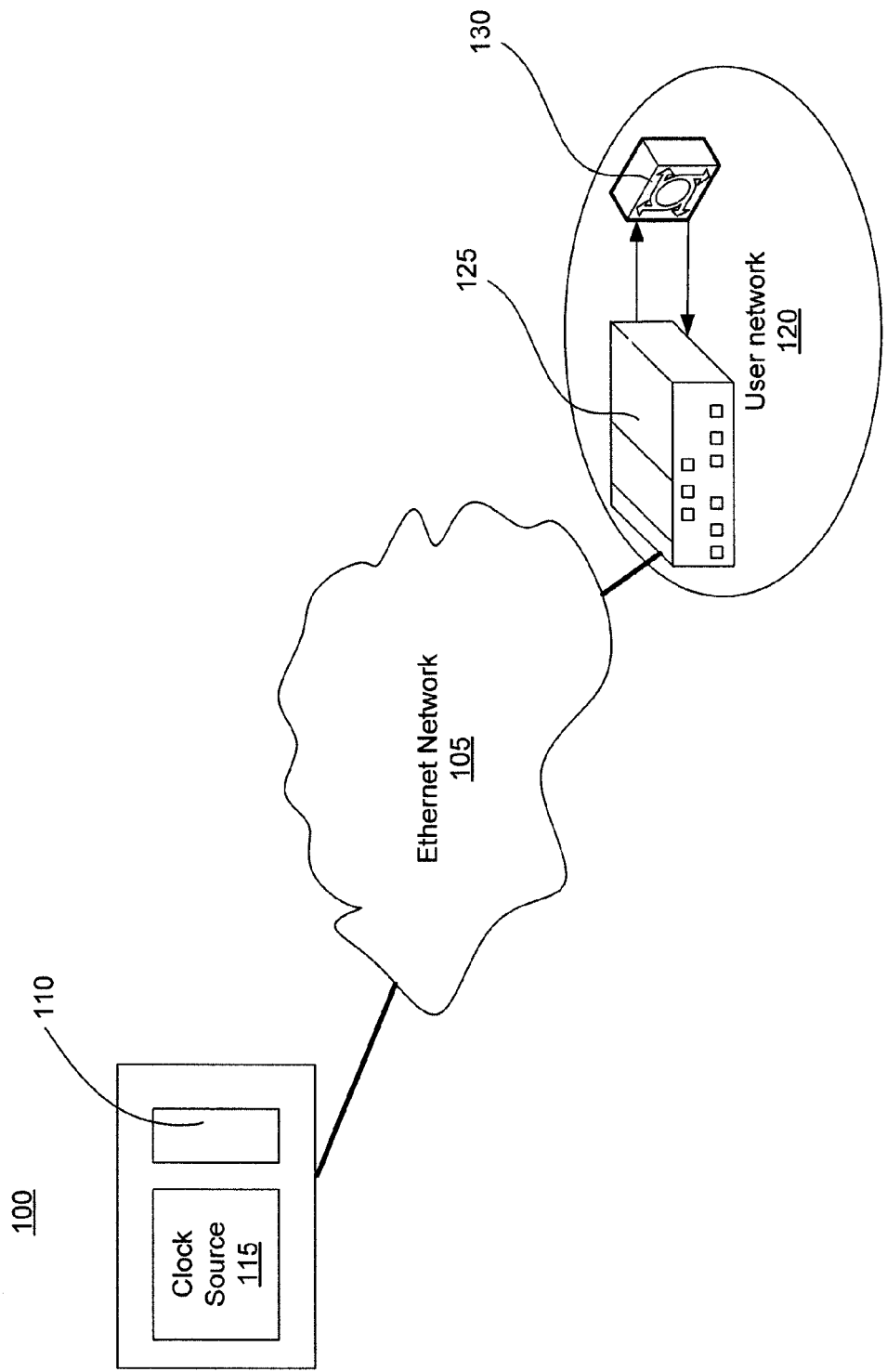
FIG. 1 is a pictorial representation of a communications environment implementing pseudowire in accordance with an illustrative embodiment.

FIG. 1 is a pictorial representation of a communications environment implementing pseudowire in accordance with an illustrative embodiment. The communications environment 100 may include any number of systems, equipments, devices, operators, nodes, and other elements. In one embodiment, the communications environment 100 may include an Ethernet network 105, a communications device 110, a clock source 115, user network 120, customer premise equipment (CPE) device 125, and an exchange 130.

The different elements and components of the communications environment 100 may communicate using hardwired connections, such as fiber optics, T1, cable, DSL, high speed trunks, and telephone lines. Alternatively, portions of the communications environment 100 may include wireless communications, including satellite connections, time division multiple access (TDMA), code division multiple access (CDMA), global systems for mobile (GSM) communications, personal communications systems (PCS), WLAN, WiMAX, or other frequently used cellular and data communications protocols and standards.

The Ethernet network 105 is a packet-switched network that allows endpoints and intermediary devices to communicate. A packet is a formatted unit of data carried by a packet node or data network. As shown, the CPE device 125 may receive a signal from the communications device through the Ethernet network 105. The CPE device may obtain or recover the line clocking from an external circuit or from an embedded or encoded clock based on the clock source 115. The clock source 115 is one embodiment of a highly accurate reference clock that may be utilized to maintain a universal time constant or other time reference. The clock source 115 may be a Stratum, atomic, GPS, radio frequency clock, or other time keeping device suitable for maintaining highly accurate time information. The clock source 115 may provide the reference clock to secondary nodes, such as the CPE device 125 and exchange 130. In one embodiment, the clock source 115 may represent the line or internal clocking recovered by intermediary devices that is further distributed to devices, such as the CPE device 125. As a result, the clock signal may retrieved directly from the clock source 115 or indirectly based on previously recovered clock signals and then further distributed to additional clocks, nodes, devices, and systems. The hierarchy of time synchronization is essential for the proper functioning of the communications environment 100 as a whole.

In one embodiment, the Ethernet network 105 may include an Ethernet topology, such as an Ethernet ring. For example, the Ethernet ring may be a metro Ethernet network. A metro Ethernet is a layer 2 network that is based on the Ethernet standard and that covers a metropolitan area. Metro Ethernet may be utilized as a metropolitan access network to connect subscribers and businesses to a wide area network (WAN), such as the Internet. In other embodiments, the Ethernet network 105 may be any number of data networks suitable for data or packet communications.

One or more large businesses, organizations, or other groups may also use metro Ethernet to connect branch offices to an intranet. The Ethernet network 105 may be used because Ethernet supports high bandwidth connections and may be easily integrated with and connected to corporate and residential customer devices, networks, or other resources. In one embodiment, the Ethernet ring may provide a next generation replacement of SONET rings.

In one embodiment, the Ethernet network 105 includes a number of switches interconnected through fiber optic connections. The Ethernet network 105 may also be any topology, structure, or design suitable for communication, such as hub-and-spoke, star, point-to-point, full mesh, partial mesh, or other Ethernet architectures. The Ethernet network 105 may include any number of devices, elements, and connections. For example, in order to communicate data through the fiber optics, any number of routers, splices, amplifiers, media converters, modulators, multiplexers, light generators, and other elements may be used.

The Ethernet network 105 may utilize a hierarchy, including core functionality, distribution functionality, and access functionality or layers. For example, the core may be the backbone of the communications network for communicating signals, data, and information from one point to another. The switches, multiplexers, routers, or other data elements of the Ethernet network are central points of connections for computers and other communications equipment in a communications network. The communications devices of the Ethernet network 105 may be located at one or more central offices, nodes, multi-tenant buildings, hardened cabinets, or other service provider or customer facilities.

Switches and other devices may need to communicate a clock signal through the Ethernet network 105 to the CPE device 125 or an edge aggregator. The CPE device 125 is the point, connection, or device at which access legs in communication with customer or user equipment interconnect with the Ethernet network 105. Clock timing may be particularly important for TDM emulation over packet communications, or other circuit based or time slot based communications protocols and standards over packet communications. Synchronous TDM includes T1, SONET/SDH, and integrated services digital network (ISDN). Additionally, a clock signal may be required to perform TDM over a non-synchronous packet network with such emulation modes as a differential mode pseudowire as previously described.

In one embodiment, the user network 120 is a TDM network that may require a clock signal, such as that originating from the clock source 115. The illustrative embodiments may recover a clock signal for further communications from the CPE device 125 utilizing real time clock extraction or by disciplining a local clock at the CPE device 125 for the same purpose. The user network 120 and Ethernet network 105 may communicate with any number of networks which may include wireless networks, data, or packet networks, cable networks, satellite networks, private networks, publicly switched telephone networks (PSTN), or other types of communication networks. The networks of the communications environment 100 may represent a single communication service provider or multiple communications services providers. The features, services, and processes of the illustrative embodiments may be implemented by the CPE device 125. In another embodiment, the system and method herein described may be performed by one or more devices of the communications environment 100 independently, or as a networked implementation.

The CPE device 125 may be a communication device using time domain multiplexing to provide telecommunications services to a particular subscriber or group of subscribers. The CPE device 125 may be a multiplexer, media converter or other similar device. The CPE device 125 may communicate with the exchange 130. The exchange 130 may be located at an organization location serving as a private branch exchange or at a local telephone company's central office, or other similar location. The exchange 130 may be a local exchange, a wire-line switch, or a public exchange. The exchange 130 may provide dial-tone, calling features, and additional digital and data services to subscribers, such as a network of telephones utilized by a user.

The user network 120 is an example of a user, customer, network, system, equipment, device, residence, building, or location of a person or group that may utilize any number of communications services. The user network 120 may include any number of individual or networks of devices for voice communication and data communication including, but not limited to telephones (i.e., voice over Internet protocol (VoIP), plain old telephone service (POTS), servers, clients, and other communications devices.

Communications networks may constrain end-to-end delays utilizing any number of standards (i.e., ITU-T G.114/G.131). Circuit emulation services may use packet buffering at the far end of a packet flow to smooth jitter, reorder packets, and recover the clock signal for playing out synchronous circuits. The buffering size and resulting latency added by TDM pseudowire depends on the circuit emulation packetization rate and resulting number of packets and packet size, but typically the size of a single frame may range from one to multiple milliseconds of buffer space. The CPE device 125 may retrieve the clock signal from a signal received from the communications device 110 to perform synchronous communications with the user networks 120 and other TDM networks. As further described herein, the clock signal may be determined by: duplicating or separating the incoming signal for data path processing in a first shorter buffer and clock recovery in a separate longer buffer; adding a delay to the clock signal; and then recovering a phase or time shifted clock signal for updating or disciplining a local clock of the CPE device 125 for user with pseudowire or other synchronized communications.

One embodiment may remove the clock recovery function from the data path jitter buffer so that the jibber buffer may be shortened. Adding a phase or time shifted clock recovery buffer of suitable depth also provides greater stability and accuracy to the clock recovery function which depends upon statistical measurements made off a group of received bits or frames. As a result, the parallel clock recovery buffer does not introduce additional delay into the circuit emulation packet path. Therefore, the clock recovery buffer size may be very large (for mathematical stability) improving clocking and stability without introducing path delay for the bearer traffic.

Figure 2:
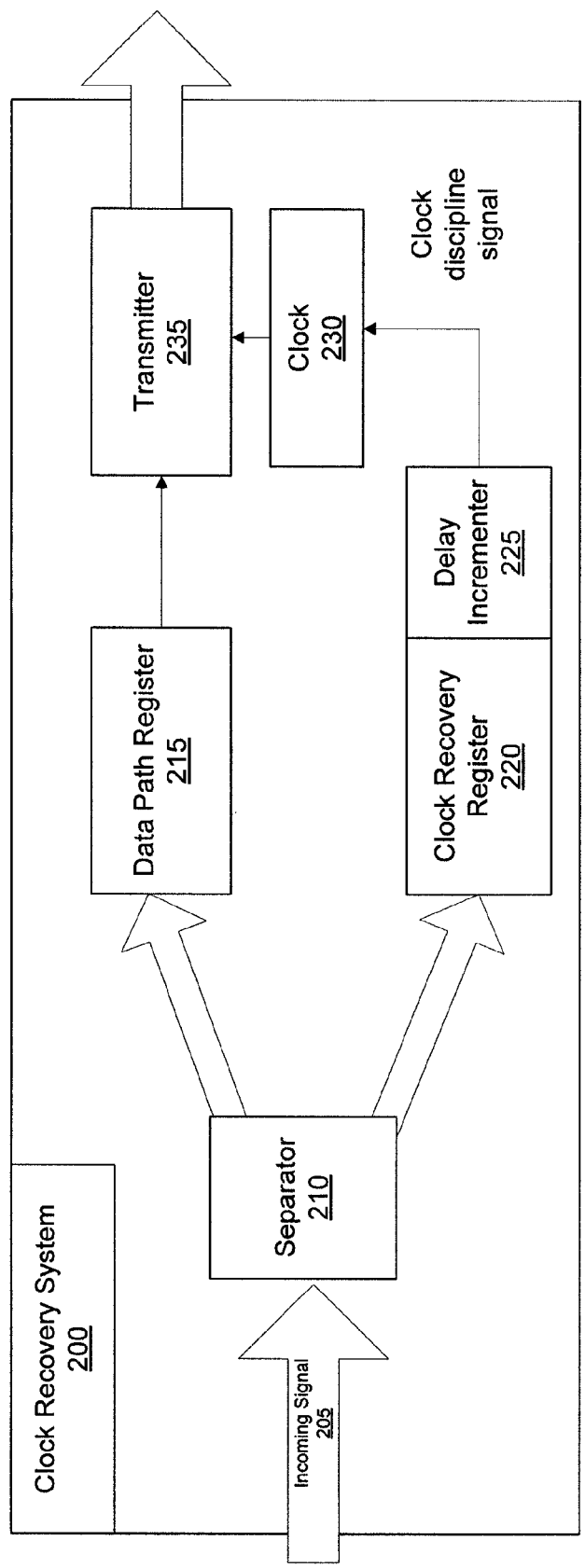
FIG. 2 is a block diagram of a clock recovery system in accordance with an illustrative embodiment.

FIG. 2 is a block diagram of a clock recovery system in accordance with an illustrative embodiment. In one embodiment, a CPE or other communications device may include a clock recovery system 200. For example, the clock recovery system 200 may integrated with a receiver or transceiver of the CPE device. The clock recovery system 200 may be an application specific integrated circuit (ASIC), field programmable gate array (FPGA), instructions stored in memory, individual circuits, logic elements, modules, chips, or any number of other elements. In one embodiment, the clock recovery system 200 may be integrated with the CPE device 125 of FIG. 1.

The clock recovery system 200 may include any number of elements including, but not limited to, an incoming signal 205, a separator 210, a data path register 215, a clock recovery register 220, a delay incrementer 225, a clock 230, and a transmitter 235. In another embodiment, the clock recovery system may be a separate device which may include a processor, memory, other components which may include busses, motherboards, circuits, ports, interfaces, cards, converters, adapters, connections, transceivers, displays, antennas, and other similar components. The processor is circuitry or logic enabled to control execution of a set of instructions. The processor may be a microprocessor, digital signal processor, application-specific integrated circuit (ASIC), central processing unit, or other device suitable for controlling an electronic device including one or more hardware and software elements, executing software, instructions, programs, and applications, converting and processing signals and information, and performing other related tasks. The processor may be a single chip or integrated with other computing or communications elements.

The memory is a hardware element, device, or recording media configured to store data for subsequent retrieval or access at a later time. The memory may be static or dynamic memory. The memory may include a hard disk, random access memory, cache, removable media drive, mass storage, or configuration suitable as storage for data, instructions, and information. In one embodiment, the memory and processor may be integrated. The memory may use any type of volatile or non-volatile storage techniques and mediums.

Packets received at the clock recovery system 200 may arrive with a delay that has a random component, known as packet delay variation. The randomness of the delay may be accounted for by the data path register 215 by reading out data at a constant rate for delivery to TDM end-user equipment, such as an exchange. The precise rate at which the data is to be clocked out of the data path register 215 may need to be determined according to a source time reference.

The clock 230 is an efficient timing device, but the clock 230 still may require disciplining based on a higher accuracy clock. To ensure quality communications, a high order of synchronization may be required, therefore the clock 230 needs to be synchronized against the reference clock frequently. In one embodiment, the synchronization may be performed for each tick of a clock. In one embodiment, the tick of the clock may correspond to the leading or trailing edge of a data transition. The clock ticks may be for picoseconds, nanoseconds, microseconds, milliseconds, decaseconds, or other time intervals. In one embodiment, the clock recovery system 200 may not include the clock 230, but rather the data stream processed by the data path register 215 may be played out or communicated directly utilizing the clock signal recovered by the clock recovery register 220.

The separator 210 is a device or module operable to separate, replicate, or duplicate the incoming signal 205 exactly. The separator 210 converts the incoming signal 205 into at least two data streams communicated to at least the data path register 215 and the clock recovery register 220. For example, the separator 210 may use a multi-cast function to split the incoming signal 205 into two signals. In another example, the separator 210 may act as mirror. In one embodiment, the separator is a packet mirror operable to exactly copy an original incoming data signal into two signals. In another embodiment, the separator 210 is a packet sniffer or packet analyzer operable to duplicate the incoming signal for analysis by the data path register 215 and clock recovery register 220.

The data path register 215 is a data register implemented using digital electronics and other suitable hardware or software. In one embodiment, the data path register 215 may include a jitter buffer. The jitter buffer is an electronic queue operable to temporarily store data packets so that a continuous playout of the packets of the incoming signal may be ensured. The data path register 215 may also be configured to reorder packets that arrive out of order and playout the packets from the data path register 215 for further communication by the transmitter 235. Continuous playout ensures a consistent rate of communication and the continuity of the packets within the signal. Continuity of packets is especially important for voice communications in which missing or out of order packets may impair the quality of voice communications. Mobile communications system that use more than one voice path between the mobile switch and the customer handset require similar path delay properties to facilitate the users movement from on tower and subsequent bearer path to another. When circuit emulation is used next to a legacy T1 system, a large buffer may induce so much differential path delay that callers traversing from one path to another during a "hand-off" exceed the systems capabilities to successfully transition which may result in dropped calls. The data path register 215 or other elements of the clock recovery system 200 may further process the data or packets to ensure communications are perpetuated without delays in data, timing, or communications characteristics.

By separating the incoming signal into two separate parallel buffers or registers, the size of the data path register 215 may be reduced to prevent delays and dropped calls. For example, in some cases calls may be dropped if the delay caused in part by the data path register 215 exceeds 16-20 milliseconds. In some existing buffers, retrieving the clock may add an additional 8 milliseconds to the delay. Such a delay may make the data stream unusable for tower backhaul which typically requires a delay of less than 5-8 milliseconds. For example, when a user's cellular handset switches primary communications between towers with differential delays for the voice streams a delay beyond 8 ms may cause an ongoing call to be dropped. In one embodiment, the data path register 215 may be required to buffer a certain amount of packets in order to play out the packets at proper intervals.

The clock recovery register 220 is a data register implemented using digital electronics or any other suitable hardware or software. The clock recovery register 220 is operable to recover the clock signal from the data stream. In one embodiment, the clock recovery register 220 utilizes transitions, such as the leading or trailing edge of bits or other signal characteristics to determine or extract the reference clock signal. For example, a clock signal may be extracted and phase aligned with the incoming data stream utilizing a phase locked loop (PLL) Any number of encoding schemes may be utilized as part of the incoming signal 205.

The size, length, or time to extract or determine the clock signal from the data stream may vary. The clock signal may not be recovered utilizing a direct or real time correlation to the bits or elements of the data signal utilized by the data path register 215. For example, the data path register 215 may only require 5 ms to process the data for additional transmissions when the clock recovery register may require 30 ms to extract an accurate clock signal. As a result, the clock signal may be utilized by the transmitter 235 to play out the data utilizing the delayed signal. Similarly, the clock 230 may be disciplined utilizing clock ticks even though the delay associated with the clock recovery register may be significant when communications are first received by the clock recovery system 200.

In another embodiment, the clock recovery register 220 may include a number of different clock recovery registers. For example, the clock recovery register 220 may include 15 ms, 30 ms, and 100 ms registers. As a result, the clock recovery register 220 may be able to recover a clock signal even in the event of a temporary fail over of data interruption because the clock recovery register 220 may be operating based on data previously received. Initial delays added by the clock recovery register 220 may be compensated for by relying on the clock 230 or by discarding the data stream within the data path register 215 that precedes the data associated with the recovered clock signal.

The delay incrementer 225 may add a delay to the clock signal before disciplining the clock. In one embodiment, the delay or delta value may correspond to synchronization with a clock tick. For example, processing by the clock recovery register 220 may require 25.6 milliseconds, but clock ticks are tracked to milliseconds, as a result, the delay incrementer may add 0.4 milliseconds to the clock signal before synchronizing the clock 230 or communicating the data stream from the transmitter 235. In some embodiments, the delay incrementer 225 may not be included at all or alternatively may be set to introduce no delay.

The recovered clock signal output by the clock recovery register 220 is utilized to discipline the clock 230 may be performed without affecting delay requirements for buffering data. For example, ticks of the clock 230 or other time intervals of the clock 230 may be synchronized with the recovered clock signal received from the clock recovery register 220.

The illustrative embodiments may allow the incoming signal to be duplicated for parallel processing to compensate for jitter and other signal problems while simultaneously recovering a clock signal to update the clock for further communication of the original incoming signal. As a result, smaller registers may be utilized and data may be more efficiently played out for additional communications.

Figure 3:
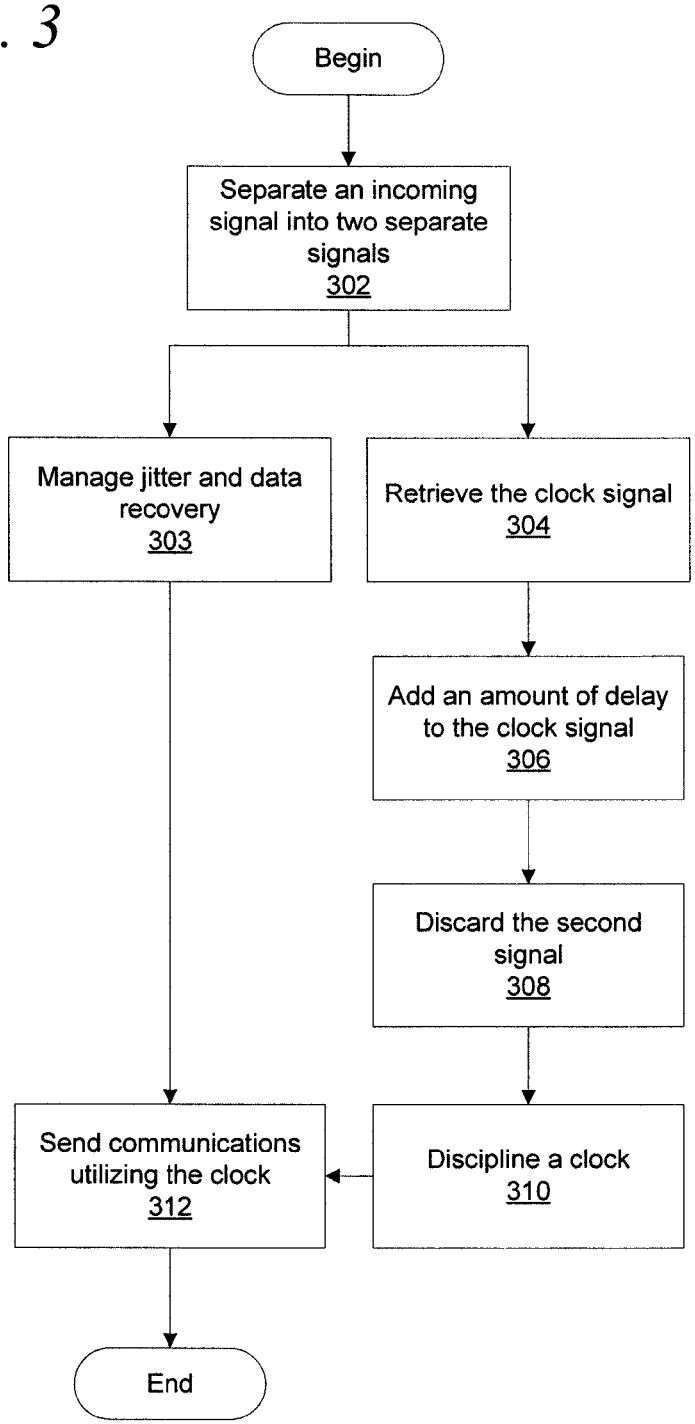
FIG. 3 is a flowchart of a process for recovering a clock in accordance with an illustrative embodiment.

FIG. 3 is a flowchart of a process for recovering a clock in accordance with an illustrative embodiment. The process of FIG. 3 may be implemented by the CPE device or a clock recovery system of a communications device. The process may begin by separating an incoming signal into two separate signals (step 302).

Next, the clock recovery system manages jitter and data recovery (step 303). During step 303, the clock recovery system may account for jitter, latency, out of order packets, and other conditions and factors that may effect the viability and reliability of the data stream passing through the clock recovery system. The clock recovery system may compensate for jitter, order, and data recovery utilizing a first signal generated or separated in step 302. For example, a first register may be utilized to compensate for jitter and order packets as necessary before playing out the packets. For example, the waveforms, bits, bytes, packets, or frames may be played out at a specified rate for processing by a CODEC for a T1 or similar connection.

Simultaneously, the clock recovery system retrieves the clock signal (step 304). The clock signal may be recovered utilizing a second signal created or separated during step 302. In one embodiment, a second shift register may be utilized to buffer the packets in order to extract the original clock signal. The functions and operations of steps 303 and 304 may be performed in parallel utilizing multiple registers so that a single larger register may not need to be utilized. The clock signal may be retrieved in step 304 utilizing any number of methods and processes utilized for pseudowire as is commonly known in the art. The register may be of any number of sizes and introduce various time delays in order to most accurately recover a clock signal. As a result, the data stream may not be played out based on real time or direct recovery of the clock signal from the data path register. A larger delay in the clock recovery register may allow the recovered clock signal to be retrieved more accurately.

Next, the clock recovery system adds an amount of delay to the recovered clock signal (step 306). The amount of time added in step 306 may be a delta value that ensures that the processing time required by the clock recovery system corresponds to ticks of a clock.

Next, the clock recovery system discards the second signal (step 308). The secondary signal and correspond bits and packets are discarded because two separate signals are generated in step 302. The second signal may only be utilized for clock recovery, and as a result, once clock recovery is performed, the secondary signal may be discarded.

Next, the clock recovery system disciplines a clock (step 310). The clock may be a secondary reference clock utilized by the CPE. For example, the clock may be a stratum 2 clock utilized by secondary nodes in a communications network. In one embodiment, the clock signal recovered and modified in step 306 is utilized to discipline the ticks or timestamps of the clock. Any number of disciplining systems, standards, or schemas may be utilized. The accurate clock ensures that communications occur according to a single standard or clock reference despite propagation delays, processing times, and other factors or communications characteristics that may affect utilization of a single clock signal in multiple devices or systems. In one embodiment, the clock recovery system may not include the clock of step 310 and as a result the recovered clock signal may be utilized to playout or otherwise communicate the data stream to other entities.

Next, the clock recovery system sends communications utilizing the clock (step 312). The communications may be TDM communications that require a clock signal. In another embodiment, the data received by the clock recovery system may be further processed utilizing the clock system.

The previous detailed description is of a small number of embodiments for implementing the invention and is not intended to be limiting in scope. The following claims set forth a number of the embodiments of the invention disclosed with greater particularity.

What is claimed is:

1. A method for separating clock recovery for synchronous communication, the method comprising:
  receiving, at a customer premises equipment (CPE) device, an incoming signal, through a metro Ethernet network, for pseudowire communication;
  separating the incoming signal into a first signal and a second signal;
  ordering packets within the first signal in a first register, wherein ordering the packets comprises reordering one or more packets that arrive out of order;
  extracting a clock signal from the second signal in a second register to generate a modified clock signal;
  accounting for a processing delay in generating the modified clock signal;
  communicating the first signal utilizing the modified clock signal; and
  disciplining a clock utilizing the modified clock signal after accounting for the processing delay in generating the modified clock signal, wherein the disciplining is performed for ticks of a reference clock encoded in the incoming signal, and wherein the disciplining is performed out of phase with the first signal in response to the processing delay.

2. The method according to claim 1, wherein the separating is replicating.

3. The method according to claim 1, wherein the separating is duplicating.

4. The method according to claim 1, wherein accounting for the processing delay comprises:
  incurring a processing delay during generation of the modified clock signal;
  rounding the processing delay to a tracked time increment for clock ticks;
  adding the rounded processing delay to the modified clock signal.

5. The method according to claim 1, wherein the communicating comprises:
  playing out the first signal utilizing the modified clock signal.

6. The method according to claim 1, wherein the first signal is received on a first network, and wherein the first signal is communicated on a second network.

7. The method according to claim 6, wherein the first network is operated by a first communication service provider, and wherein the second network is operated by a second communication service provider.

8. A clock recovery unit in a customer premises equipment (CPE), comprising:
  a processor for executing a set of instructions; and
  a memory for storing the set of instructions, wherein the set of instructions are executable by the processor to:
    receive an incoming signal, through a metro Ethernet network, for a pseudowire communication;
    separate the incoming signal into a first signal and a second signal;
    order packets within the first signal in a first register, wherein ordering the packets comprises reordering one or more packets that arrive out of order;
    extract a clock signal from the second signal in a second register to generate a modified clock signal;
    account for a processing delay in generating the modified clock signal;
    communicate the first signal utilizing the modified clock signal;
    discipline a clock utilizing the modified clock signal after accounting for the processing delay in generating the modified clock signal, wherein the instructions executable to discipline a clock comprise instructions to discipline a clock for ticks of a reference clock encoded in the incoming signal, and wherein the instructions executable to discipline a clock comprise instructions to discipline a clock out of phase with the first signal in response to the processing delay.

9. The clock recovery unit according to claim 8, wherein the instructions executable to separate the incoming signal comprise instructions executable to replicate the incoming signal.

10. The clock recovery unit according to claim 8, wherein the instructions executable to separate the incoming signal comprise instructions executable to duplicate the incoming signal.

11. The clock recovery unit according to claim 8, wherein accounting for a processing delay in generating the modified clock signal comprises:
  incurring a processing delay during generation of the modified clock signal;
  rounding the processing delay to a tracked time increment for clock ticks;
  adding the rounded processing delay to the modified clock signal.

12. The clock recovery unit according to claim 8, wherein the instructions to communicate the first signal comprise instructions executable to play out the first signal utilizing the modified clock signal.

13. The clock recovery unit according to claim 8, wherein the first signal is received on a first network, and wherein the first signal is communicated on a second network.

14. The clock recovery unit according to claim 13, wherein the first network is operated by a first communication service provider, and wherein the second network is operated by a second communication service provider.

* * * * *